(12) United States Patent
Fehrenbach et al.

(10) Patent No.: US 12,155,472 B2
(45) Date of Patent: *Nov. 26, 2024

(54) SIDELINK FEEDBACK

(71) Applicant: Fraunhofer-Gesellschaft zur Foerderung der angewandten Forschung e.V., Munich (DE)

(72) Inventors: Thomas Fehrenbach, Berlin (DE); Baris Goektepe, Berlin (DE); Thomas Wirth, Berlin (DE); Cornelius Hellge, Berlin (DE); Sarun Selvanesan, Berlin (DE); Robin Thomas, Berlin (DE); Thomas Schierl, Berlin (DE)

(73) Assignee: Fraunhofer-Gesellschaft zur Foerderung der angewandten Forschung e. V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/233,730

(22) Filed: Aug. 14, 2023

(65) Prior Publication Data

US 2023/0388047 A1 Nov. 30, 2023

Related U.S. Application Data

(63) Continuation of application No. 17/209,763, filed on Mar. 23, 2021, now Pat. No. 11,770,208, which is a
(Continued)

(30) Foreign Application Priority Data

Sep. 27, 2018 (EP) .................... 18197380

(51) Int. Cl.
*H04L 1/00* (2006.01)
*H04L 1/1607* (2023.01)

(52) U.S. Cl.
CPC .......... *H04L 1/0027* (2013.01); *H04L 1/0026* (2013.01); *H04L 1/1614* (2013.01); *H04L 1/1621* (2013.01)

(58) Field of Classification Search
CPC ... H04L 1/0027; H04L 1/0026; H04L 1/1614; H04L 1/1621; H04L 1/0003;
(Continued)

(56) References Cited

U.S. PATENT DOCUMENTS

2013/0083753 A1  4/2013 Lee et al.
2017/0215183 A1  7/2017 Gulati et al.
(Continued)

FOREIGN PATENT DOCUMENTS

CN  107196743 A  9/2017
EP  2688226 A2  1/2014
(Continued)

OTHER PUBLICATIONS

"Discussion of sidelink unicast, groupcast and broadcast for NR-V2X", OPPO, R1-1808875, 3GPP TSG RAN WG1 #94, 3GPP server publication date (Aug. 10, 2018), Aug. 10, 2018, 4 pp.
(Continued)

*Primary Examiner* — Ian N Moore
*Assistant Examiner* — Latresa A McCallum
(74) *Attorney, Agent, or Firm* — Perkins Coie LLP; Michael A. Glenn

(57) ABSTRACT

An apparatus for a wireless communication system is connected to at least one user device (UE) via a sidelink for a sidelink communication. For a unicast transmission, the apparatus transmits a sidelink frame having a certain frame duration. A first part of the sidelink frame includes a control signaling. The control signaling indicates to the UE whether a feedback is to be returned to the apparatus. The feedback indicates a successful reception of data at the UE or a
(Continued)

sidelink channel condition. If a feedback is desired, the apparatus transmits in the first part of the frame, using the control signaling, an indication that the feedback is to be provided by the UE such that a duration of the control signaling is shorter, by a remaining duration, than the frame duration, and receives from the UE, during the remaining duration, the feedback.

26 Claims, 9 Drawing Sheets

Related U.S. Application Data continuation of application No. PCT/EP2019/076290, filed on Sep. 27, 2019.

(58) Field of Classification Search
CPC ... H04L 1/0009; H04L 1/1861; H04L 5/0053; H04L 5/0057; H04L 5/0055; H04W 72/20; H04W 72/542; H04W 76/14; H04W 92/18

See application file for complete search history.

(56) References Cited

U.S. PATENT DOCUMENTS

| | | | |
|---|---|---|---|
| 2017/0223685 A1 | 8/2017 | Seo et al. | |
| 2017/0331670 A1 | 11/2017 | Parkvall et al. | |
| 2017/0347394 A1 | 11/2017 | Yasukawa et al. | |
| 2018/0035448 A1 | 2/2018 | Gupta et al. | |
| 2018/0077718 A1 | 3/2018 | Nory et al. | |
| 2018/0115430 A1* | 4/2018 | Seo | H04W 74/0833 |
| 2018/0192365 A1* | 7/2018 | Feng | H04W 48/20 |
| 2021/0243841 A1 | 8/2021 | Yasukawa et al. | |

FOREIGN PATENT DOCUMENTS

| | | |
|---|---|---|
| JP | 2016119681 A | 6/2016 |
| WO | 2013043017 A2 | 3/2013 |
| WO | 2016076301 A1 | 5/2016 |
| WO | 2016163972 A1 | 10/2016 |

OTHER PUBLICATIONS

"Sidelink Design for NrR V2X", ETRI, R1-1809498, 3GPP TSG RAN WG1 #94, 3GPP server publication date (Aug. 17, 2018), Aug. 17, 2018, 7 pp.

3GPP TSG-RAN WG1, "Physical layer design of NR sidelink", Ericsson, Physical layer design of NR sidelink [online], 3GPP TSG RAN WG1 #94R1-1809302, Aug. 2018, 10 pp.

Ericsson, "On 2-stage PSCCH-I design", 3GPP R1-1811607, 3GPP TSG-RAN WG1 Meeting #94bis Tdoc R1-1811607, Chengdu, China, Oct. 8-12, 2018, Oct. 8, 2018, 5 pp.

Ericsson, "Physical layer structures of NR V2X", 3GPP R1-1811592, 3GPP TSG-RAN WG1 Meeting #94bis Tdoc R1-1811592, Chengdu, China, Oct. 8-12, 2018, Oct. 8, 2018, 16 pp.

LG Electronics, "Discussion on feedback information on sidelink", 3GPP TSG RAN WG1 Meeting #89, R1-1707586, May 2017, May 2017, 3 pp.

LG Electronics, "Discussion on feedback information on sidelink", 3GPP TSG RAN WG1 Meeting #90, R1-1713118, Aug. 2017, Aug. 2017, 3 pp.

* cited by examiner

SIDELINK FEEDBACK

CROSS-REFERENCE TO RELATED APPLICATIONS

This application is a continuation of copending U.S. patent application Ser. No. 17/209,763, filed Mar. 23, 2021, now issued as U.S. Pat. No. 11,770,208, which in turn is a continuation of copending International Application No. PCT/EP2019/076290, filed Sep. 27, 2019, which is incorporated herein by reference in its entirety, and additionally claims priority from European Application No. 18197380.1, filed Sep. 27, 2018, which is also incorporated herein by reference in its entirety.

BACKGROUND OF THE INVENTION

The present application relates to the field of wireless communication systems or networks, more specifically to approaches for a wireless communication among user devices of a wireless communication system using a sidelink communication. Embodiments concern the feedback over a sidelink interface, for example in case of D2D or V2X communications.

FIG. 1 is a schematic representation of an example of a terrestrial wireless network 100 including, as is shown in FIG. 1(a) a core network 102 and one or more radio access networks $RAN_1$, $RAN_2$, ... $RAN_N$. FIG. 1(b) is a schematic representation of an example of a radio access network RAN D that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1(b) shows an exemplary view of only five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by an heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, New Radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above mentioned devices. Such devices may also communicate directly with each other (D2D communication) using the SL channels.

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station.

FIG. 2 is a schematic representation of a situation in which two UEs directly communicating with each other are both in coverage of a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The gNB assigns the resources to be used for the V2V communication over the sidelink. This configuration is also referred to as a mode 1 configuration in NR V2X or as a mode 3 configuration in LTE V2X. a FIG. 3 is a schematic representation of a situation in which the UEs are not in coverage of a base station, i.e., the respective UEs directly communicating with each other are not connected to a base station, although they may be physically within a cell of a wireless communication network. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is an out-of-coverage scenario does not mean that the respective mode 4 UEs are outside of the coverage 200 of a base station, rather, it means that the respective mode 4 UEs are not served by a base station or are not connected to the base station of the coverage area. Thus, there may be situations in which, within the coverage area 200 shown in FIG. 2, in addition to the mode 3 UEs 202, 204 also mode 4 UEs 206, 208, 210 are present.

In the above-described scenarios reference has been made to vehicular user devices, UEs, and a V2V or V2X communication using the sidelink interface. Such vehicular user devices may be employed, e.g., in the field of the transport industry in which a plurality of vehicles being equipped with vehicular user devices may be controlled by a remote driving application. Other use cases in which a plurality of user devices may communicate among each other using the sidelink include, for example, factory automation and electrical power distribution. In the case of factory automation, a plurality of mobile or stationary machines within a factory may be equipped with user devices employing a sidelink communication, for example for controlling the operation of a machine, like a motion control of a robot. In the case of electrical power distribution, entities within the power distribution grid may be equipped with respective user devices which, within a certain area of the system may communicate via a sidelink communication with each other so as to allow for monitoring the system and for dealing with power distribution grid failures and outages.

It is noted that the information in the above section is only for enhancing the understanding of the background of the invention and therefore it may contain information that does not form prior art that is already known to a person of ordinary skill in the art.

Starting from a prior art as described above, when considering the above scenarios and, more generally, a wireless communication system in which a plurality of users may communicate directly with each other via a sidelink, there may be a need for an improved communication providing for a reliable transmission of information via the sidelink.

SUMMARY

An embodiment may have an apparatus for a wireless communication system, wherein the apparatus is configured to be connected to at least one user device, UE, of the wireless communication system via a sidelink for a sidelink communication with the at least one UE, wherein, for a unicast transmission to the UE, the apparatus is configured to transmit a sidelink frame comprising a certain frame duration, a first part of the sidelink frame comprising a control signaling, the control signaling indicating to the UE whether a feedback is to be returned to the apparatus, the feedback indicating a successful reception of data at the UE and/or a sidelink channel condition, and wherein, in case the feedback from the UE is desired, the apparatus is configured to transmit in the first part of a current sidelink frame, using the control signaling, the indication that the feedback is to be provided by the UE such that in a subsequent sidelink frame a duration of the control signaling and data part is shorter, by a remaining duration, than the frame duration, and receive from the UE, during the remaining duration in the subsequent sidelink frame, the feedback for data transmitted in the current sidelink frame.

Another embodiment may have an apparatus for a wireless communication system, wherein the apparatus is configured to be connected to at least one user device, UE, of the wireless communication system via a sidelink for a sidelink communication with the at least one UE, wherein, for a unicast transmission to the UE, the apparatus is configured to transmit a sidelink frame comprising a certain frame duration, a first part of the sidelink frame comprising a control signaling, the control signaling indicating to the UE whether a feedback is to be returned to the apparatus, the feedback indicating a successful reception of data at the UE and/or a sidelink channel condition, and wherein, in case the feedback from the UE is desired, the apparatus is configured to transmit in the first part of the frame, using the control signaling, the indication that the feedback is to be provided by the UE such that a duration of the control signaling is shorter, by a remaining duration, than the frame duration, and receive from the UE, during the remaining duration, the feedback.

Another embodiment may have an apparatus for a wireless communication system, wherein the apparatus is configured to be connected to at least one user device, UE, of the wireless communication system via a sidelink for a sidelink communication with the at least one UE, wherein, for a unicast transmission to the UE, the apparatus is configured to receive a sidelink frame comprising a certain frame duration, a first part of the sidelink frame comprising a control signaling, the control signaling indicating to the UE whether a feedback is to be returned to the UE, the feedback indicating a successful reception of data at apparatus and/or a sidelink channel condition, and wherein, in case the feedback to the UE is desired, the apparatus is configured to receive from the first part of a current sidelink frame, using the control signaling, the indication that the feedback is to be provided by the apparatus such that in a subsequent sidelink frame a duration of the control signaling and data part is shorter, by a remaining duration, than the frame duration, and determine and transmit the feedback for data transmitted in the current sidelink frame to the UE, during the remaining duration in the subsequent sidelink frame.

Another embodiment may have an apparatus for a wireless communication system, wherein the apparatus is configured to be connected to at least one user device, UE, of the wireless communication system via a sidelink for a sidelink communication with the at least one UE, wherein, for a unicast reception from the UE, the apparatus is configured to receive a sidelink frame comprising a certain frame duration, a first part of the sidelink frame comprising a control signaling, the control signaling indicating whether a feedback is to be returned to the UE, the feedback indicating a successful reception of data to the apparatus and/or a sidelink channel condition, and wherein, in case the feedback from the UE is desired, the apparatus is configured to retrieve from the first part of the frame the indication that the feedback is to be provided by the apparatus, and determine the feedback and transmit the feedback to the UE during the frame duration.

Another embodiment may have a wireless communication network, comprising one or more apparatuses according to the invention.

Another embodiment may have a method for transmitting from a transmitting UE to a receiving UE in a wireless communication system via a sidelink, the method comprising: transmitting, by the transmitting UE, a sidelink frame comprising a certain frame duration, a first part of the sidelink frame comprising a control signaling, the control signaling indicating to the UE whether a feedback is to be returned to the apparatus, the feedback indicating a successful reception of data at the UE and/or a sidelink channel condition, and wherein, in case the feedback from the UE is desired, transmitting in the first part of a current sidelink frame, using the control signaling, the indication that the feedback is to be provided by the UE such that in a subsequent sidelink frame a duration of the control signaling and data part is shorter, by a remaining duration, than the frame duration, and receiving, at the transmitting UE, during the remaining duration in the subsequent sidelink frame, the feedback from the receiving UE for data transmitted in the current sidelink frame.

Another embodiment may have a method for transmitting from a transmitting UE to a receiving UE in a wireless communication system via a sidelink, the method comprising: transmitting, by the transmitting UE, a sidelink frame comprising a certain frame duration to the receiving UE, a first part of the sidelink frame comprising a control signaling, the control signaling indicating to the UE whether a feedback is to be returned to the apparatus, the feedback indicating a successful reception of data at the UE and/or a sidelink channel condition, and in case the feedback from the receiving UE is desired, transmitting in the first part of the frame, using the control signaling, the indication that the feedback is to be provided by the UE such that a duration of the control signaling is shorter, by a remaining duration, than the frame duration, and receiving, at the transmitting UE, during the remaining duration the feedback from the receiving UE.

Another embodiment may have a method for transmitting feedback from a receiving UE to a transmitting receiving UE in a wireless communication system via a sidelink, the method comprising: receiving, at the receiving UE, a sidelink frame comprising a certain frame duration, a first part of the sidelink frame comprising a control signaling, the control signaling indicating to the UE whether a feedback is to be returned to the UE, the feedback indicating a successful reception of data at apparatus and/or a sidelink channel condition, and wherein, in case the feedback, receiving, by the receiving UE, from the first part of a current sidelink frame, using the control signaling, the indication that the feedback is to be provided such that in a subsequent sidelink frame a duration of the control signaling and data part is shorter, by a remaining duration, than the frame duration, and determining and transmitting, by the receiving UE, the feedback for data transmitted in the current sidelink frame to the transmitting UE, during the remaining duration in the subsequent sidelink frame.

Another embodiment may have a method for transmitting feedback from a receiving UE to a transmitting receiving UE in a wireless communication system via a sidelink, the method comprising: receiving, at a receiving UE, a sidelink frame comprising a certain frame duration from a transmitting UE, a first part of the sidelink frame comprising a control signaling, the control signaling indicating whether a feedback is to be returned to the UE, the feedback indicating a successful reception of data to the apparatus and/or a sidelink channel condition, and in case the feedback is desired, retrieving, by the receiving UE, from the first part of the frame the indication that the feedback is to be provided by the apparatus, and determining the feedback and transmitting, by from the receiving UE, the feedback to the transmitting UE during the frame duration.

Another embodiment may have a non-transitory digital storage medium having stored thereon a computer program for performing a method for transmitting from a transmitting UE to a receiving UE in a wireless communication system via a sidelink, the method comprising: transmitting, by the transmitting UE, a sidelink frame comprising a certain frame duration, a first part of the sidelink frame comprising a control signaling, the control signaling indicating to the UE whether a feedback is to be returned to the apparatus, the feedback indicating a successful reception of data at the UE and/or a sidelink channel condition, and wherein, in case the feedback from the UE is desired, transmitting in the first part of a current sidelink frame, using the control signaling, the indication that the feedback is to be provided by the UE such that in a subsequent sidelink frame a duration of the control signaling and data part is shorter, by a remaining duration, than the frame duration, and receiving, at the transmitting UE, during the remaining duration in the subsequent sidelink frame, the feedback from the receiving UE for data transmitted in the current sidelink frame, when said computer program is run by a computer.

BRIEF DESCRIPTION OF THE DRAWINGS

Embodiments of the present invention are now described in further detail with reference to the accompanying drawings, in which:

FIG. 7a-d illustrates different examples for frames for transmitting data from user A to user B, wherein FIG. 7(a) illustrates a conventional frame, FIG. 7(b) illustrates the structure of the frame of FIG. 5, FIG. 7(c) illustrates another embodiment of the inventive frame structure including reference symbols RS, and FIG. 7(d) illustrates a frame sending reference symbols at higher frequencies;

FIG. 10a-b illustrates respective values for new fields in a SCI at a user B, in case of the example of FIG. 9, wherein FIG. 10(a) illustrates the initial state of the fields at user B, and FIG. 10(b) illustrates how the fields change during the transmissions or frames in FIG. 9;

DETAILED DESCRIPTION OF THE INVENTION

Figure 1A:
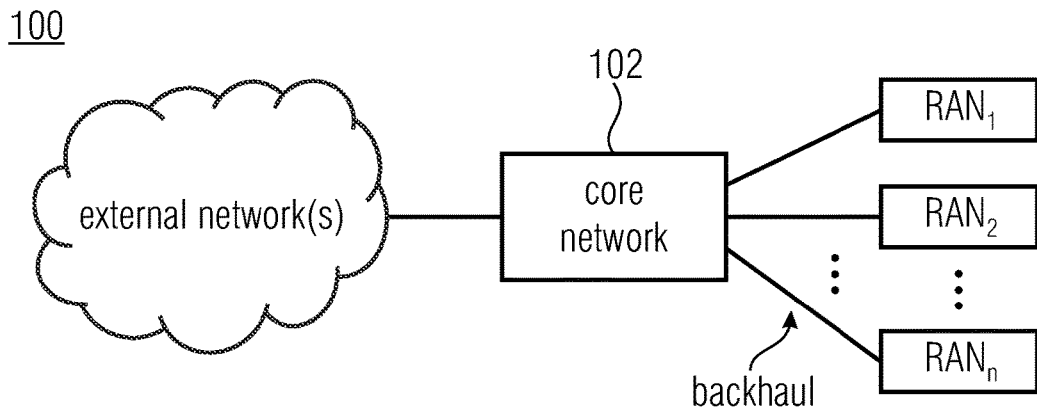
FIG. 1a-b shows a schematic representation of an example of a wireless communication system.

Embodiments of the present invention is now described in more detail with reference to the accompanying drawings in which the same or similar elements have the same reference signs assigned.

The initial vehicle-to-everything (V2X) specification was included in LTE Release 14 of the 3GPP standard. The scheduling and assignment of resources had been modified according to the V2X requirements, while the original device-to-device (D2D) communication standard has been used as a basis of the design. Cellular V2X has been agreed to operate in two configurations from a resource allocation perspective, namely in the above-described mode 3 and mode 4 configurations. As mentioned above, in the V2X mode 3 configuration the scheduling and interference management of resources is performed by the base station for UEs within the coverage of the base station so as to enable sidelink, SL, communications, like vehicle-to-vehicle communications. The control signaling is provided to the UE over the Uu interface, for example using the downlink control indicator, DCI, and is dynamically assigned by the base station. In the V2X mode 4 configuration the scheduling and interference management for SL communications is autonomously performed using distributed or decentralized algorithms among the UEs based on a preconfigured resource configuration. As is described above, there are different scenarios or use cases in which a communication among the group members is desired, which is also referred to as a groupcast communication. Such groupcast communications entail that the members of the group are able to communicate with each other over shorter distances, while maintaining a high level of reliability and low latency. Examples of the mentioned use cases are vehicle platooning, extended sensors, advanced driving and remote driving.

Current implementations of the sidelink communication among a plurality of user devices include a communication channel from the transmitting UE to the receiving UE so as to transmit control data and associated user data from the transmitting UE to the receiving UE. Such a communication may be referred to as a sidelink unicast transmission, in case the communication from the transmitting UE is directed to only one other UE. Other communications may include a sidelink broadcast transmission in accordance with which the transmitting UE transmits or sends a message or data to all user devices over the sidelink communication being in range of the transmitting UE. Yet other sidelink transmissions may include so-called sidelink group transmissions concerning a certain number of user devices which are grouped together, for example, by having assigned a common group ID, and in this situation the transmitting UE transmits data that is only designated for the UEs being members of the group. The channel among the transmitting UE and the one or more receiving UEs, however, may not be stable and may change or may be affected by certain external parameters so that data sent by the transmitting UE may not be received at the UE or may be received at the UE in a condition that does not allow the UE to successfully decode the data.

Currently, there is no mechanism provided for sidelink transmissions ensuring an efficient and reliable transmission of data within low latency constraints from a transmitting UE to a receiving UE, and the present invention aims at solving the problems of an inefficient and unreliable sidelink interface among communicating user devices by providing a feedback mechanism from the receiving UE to the transmitting UE. More specifically, in accordance with embodiments of the present invention, a sidelink control channel or feedback channel from the receiving UE to the transmitting UE is provided so as to send to the transmitting UE a feedback indicating a successful/non-successful reception of data at the receiving UE, along with reports indicating the channel state and/or quality information. Currently, the existing standards do not implement a feedback channel for the sidelink from the receiving UE to the transmitting UE.

The inventive approach is advantageous as it implements a feedback mechanism for sidelink transmissions, like sidelink unicast transmissions, within the existing frame structure for sidelink transmission. In accordance with embodiments of the inventive approach, a transmission time interval (TTI) having a structure for transmitting data from a transmitting UE to a receiving UE in such a way that, initially, an indication is transmitted towards the receiving UE indicating as to whether a feedback is to be sent or not, and, in addition, by sending the control data and, in accordance with examples, also user data within the TTI in such a way that the transmission is completed at a certain duration before the end of the interval. The duration before the end of the TTI is selected such that the receiving UE, within this duration is in the position to process the received data, like to decode the data, and if needed, to switch from receiving to transmitting for sending the feedback to the transmitter before the actual duration of the TTI ends. Stated differently, embodiments of the present invention allow for sending the feedback directly after the transmission of the data, i.e., prior or before the next TTI is transmitted.

Figure 1B:
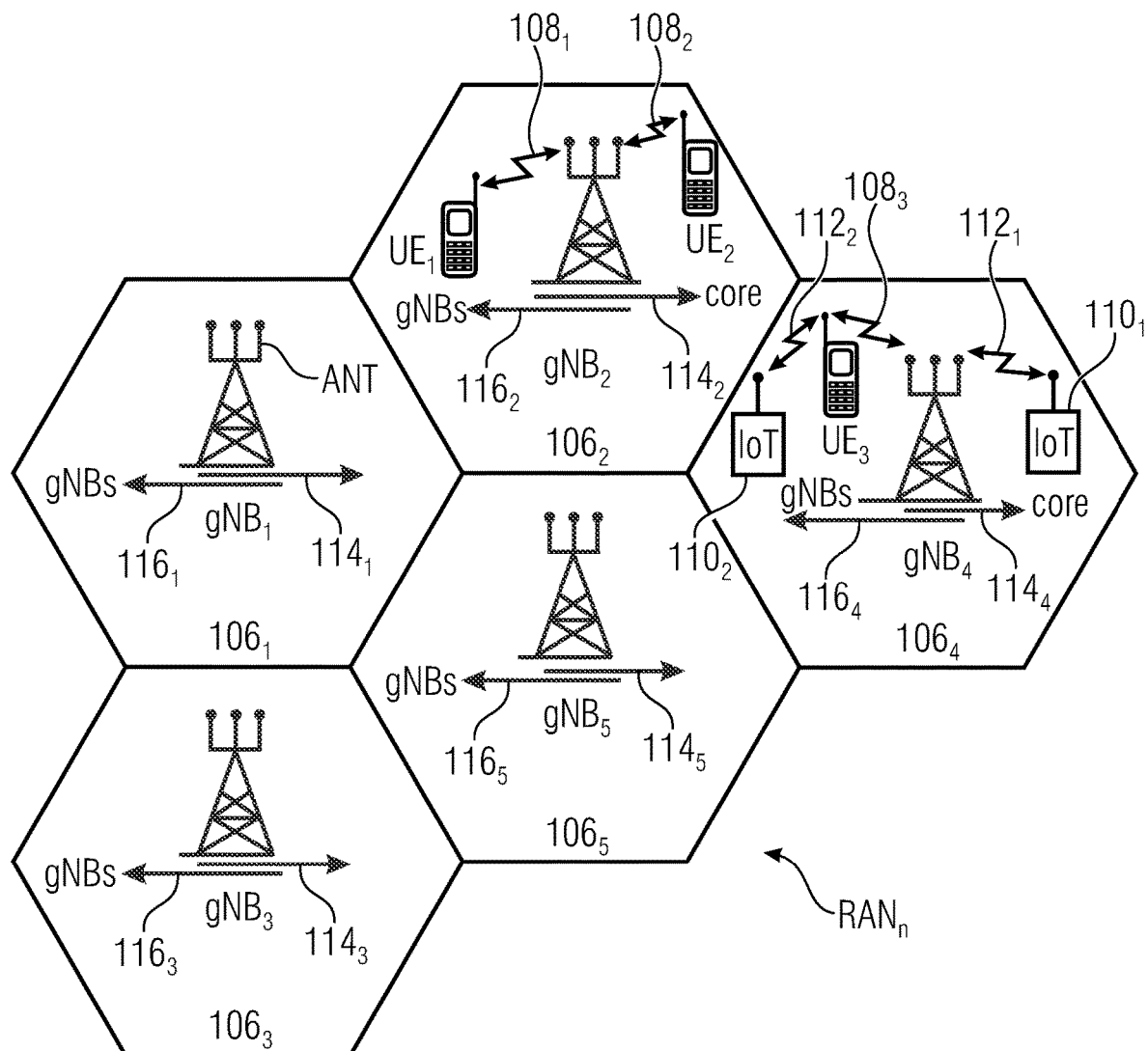
Figure 2:
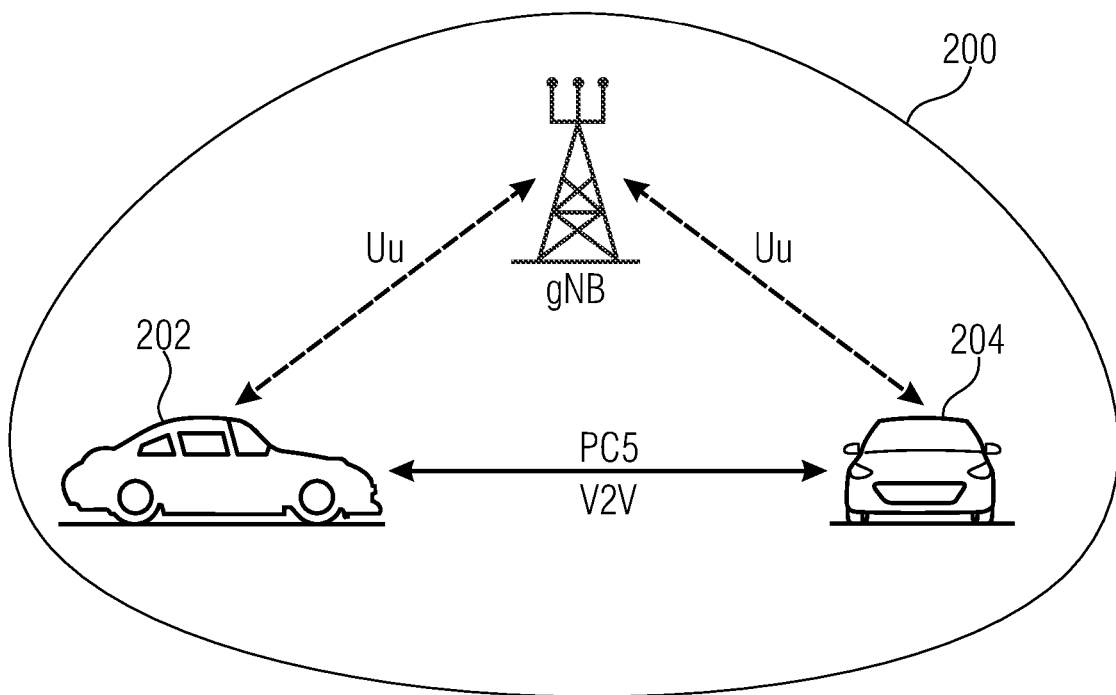
FIG. 2 shows a schematic representation of a situation in which UEs directly communicating with each other are in coverage of a base station.
Figure 3:
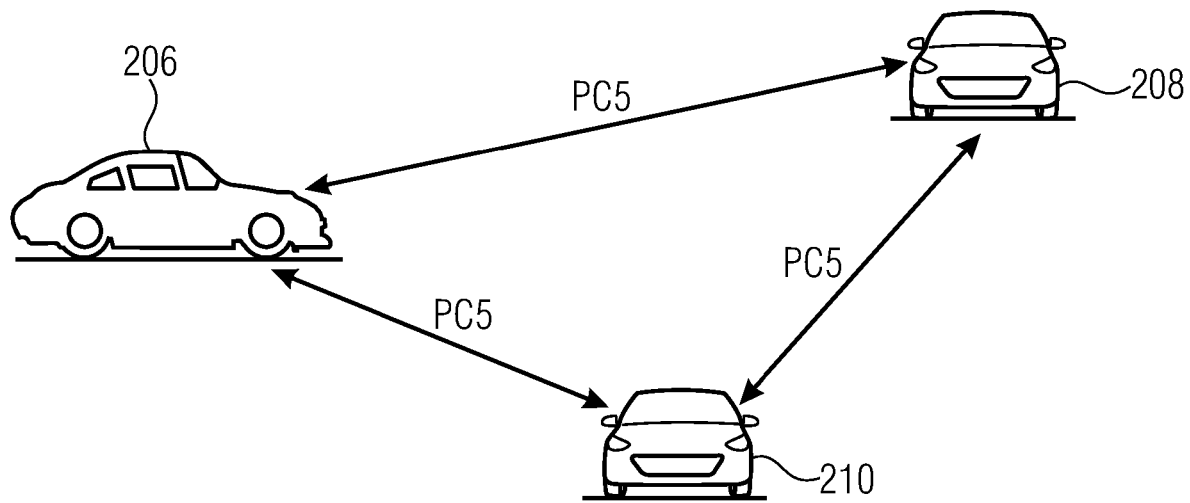
FIG. 3 shows a scenario in which UEs directly communicating with each other are not are not in coverage of a base station, i.e., are not connected to a base station.
Figure 4:
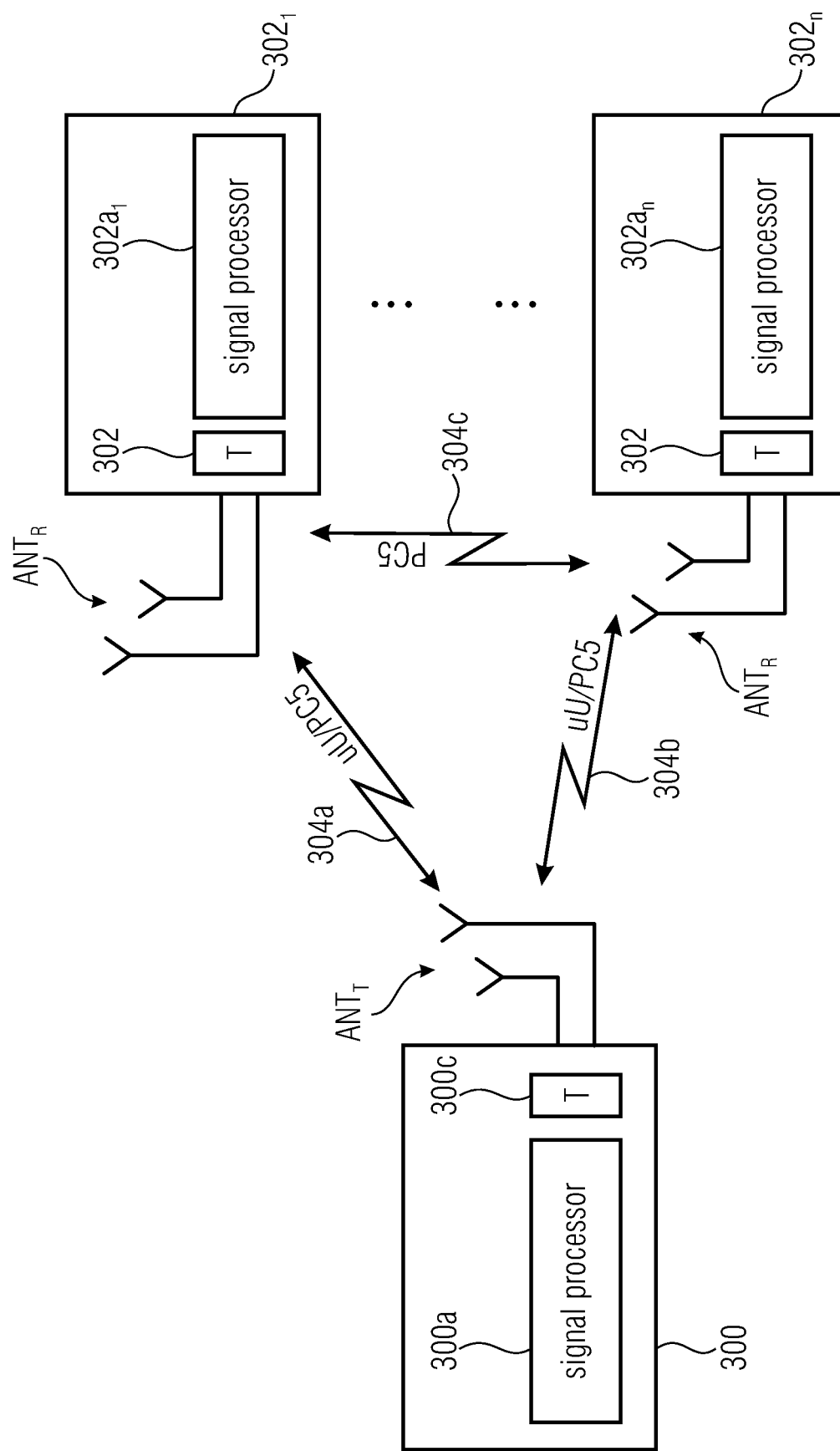
FIG. 4 is a schematic representation of a wireless communication system for communicating information between a transmitter and one or more receivers in accordance with embodiments of the present invention.

Thus, the present invention aims at providing an improved approach for providing a reliable communication among UEs over a sidelink. This is addressed by the present invention as described hereinbelow in more detail, and embodiments of the present invention may be implemented in a wireless communication system as depicted in FIG. 1, FIG. 2 and FIG. 3 including base stations and users, like mobile terminals or IoT devices. FIG. 4 is a schematic representation of a wireless communication system including a transmitter 300, like a base station, and one or more receivers $302_1$ to $302_n$, like user devices, UEs. The transmitter 300 and the receivers 302 may communicate via a wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface.

The system, the base station 300 and the one or more UEs 302 may operate in accordance with the inventive teachings described herein.

Transmitting Apparatus or UE

The present invention provides an apparatus for a wireless communication system,
wherein the apparatus is configured to be connected to at least one user device, UE, of the wireless communication system via a sidelink for a sidelink communication with the at least one UE,
wherein, for a unicast transmission to the UE, the apparatus is configured to transmit a sidelink frame having a certain frame duration, a first part of the sidelink frame including a control signaling, the control signaling indicating to the UE whether a feedback is to be returned to the apparatus, the feedback indicating a successful reception of data at the UE and/or a sidelink channel condition, and
wherein, in case the feedback from the UE is desired, the apparatus is configured to
transmit in the first part of a current sidelink frame, using the control signaling, the indication that the feedback is to be provided by the UE such that in a subsequent sidelink frame a duration of the control signaling and data part is shorter, by a remaining duration, than the frame duration, and
receive from the UE, during the remaining duration in the subsequent sidelink frame, the feedback for data transmitted in the current sidelink frame.

The present invention provides an apparatus for a wireless communication system,
wherein the apparatus is configured to be connected to at least one user device, UE, of the wireless communication system via a sidelink for a sidelink communication with the at least one UE,
wherein, for a unicast transmission to the UE, the apparatus is configured to transmit a sidelink frame having a certain frame duration, a first part of the sidelink frame including a control signaling, the control signaling indicating to the UE whether a feedback is to be returned to the apparatus, the feedback indicating a successful reception of data at the UE and/or a sidelink channel condition, and
wherein, in case the feedback from the UE is desired, the apparatus is configured to
transmit in the first part of the frame, using the control signaling, the indication that the feedback is to be provided by the UE such that a duration of the control signaling is shorter, by a remaining duration, than the frame duration, and
receive from the UE, during the remaining duration, the feedback.

In other words, an apparatus (UE) transmitting to another UE via a SL is provided which indicates in the frame whether SL feedback is to be employed or not and, in case the feedback is desired, to receive the feedback during the frame duration.

In accordance with embodiments, for a unicast transmission of data to the UE and in case the feedback from the UE is desired, the apparatus is configured to transmit in the first part of the frame the control signaling and in a second part of the frame, using a data signaling, the data such that a combined duration of the control signaling and the data signaling is shorter, by the remaining duration, than the frame duration.

In other words, in addition to control signaling also data signaling may be included in the frame such that enough time to return the feedback remains.

In accordance with embodiments, the remaining duration is such that the UE is able to process the control signaling and/or the data signaling, and to return the feedback to the apparatus during the frame duration.

In accordance with embodiments, the apparatus is configured to
include into the first and/or second part of the frame one or more reference signals, the reference signals used at the UE to determine one or more properties of the transmission channel form the apparatus to the UE, like a channel state, CSI, a CQI, and/or a precoding matrix indicator (PMI) information in case of MIMO transmissions,
receive from the UE information about the transmission channel properties, and
adapt transmission parameters, like a modulation and coding scheme, MCS, precoding, and/or a power level, responsive to the received transmission channel properties, In accordance with embodiments, the apparatus is configured to transmit the one or more reference signals in a first frequency range and in at least a second frequency range, the frequencies in the second frequency range being higher than the frequencies in the first frequency range.

In accordance with embodiments, in case no feedback from the UE is desired, the apparatus is configured to transmit in the first part of the frame, using the control signaling, the indication that no feedback is to be provided by the UE, and in the second part of the frame, using the data signaling, the data such that a combined duration of the control signaling and the data signaling is equal to the frame duration.

In other words, in case no feedback is needed, the control and data signaling are provided with a duration equal to the frame duration and no time for feedback with the frame duration is reserved.

In accordance with embodiments, the apparatus is configured to
transmit one or more first frames indicating in the first part of the frame, using the control signaling, that no feedback is to be provided by the UE, and in the second part of the frame, using the data signaling, the data,
transmit, after the transmission of the one or more first frames, a second frame, the second frame only indicating in the first part of the frame, using the control signaling, that the feedback for the data in the one or more first frames is to be provided by the UE, and
receive, during the frame duration of the second frame, the feedback for the data in the one or more first frames.

In other words, one or more novel data only frames are transmitted first (control indicates that no feedback is needed), followed by a control only frame so that in the remaining duration of the control only frame the feedback for the data in the preceding data only frames is received.

In accordance with embodiments, wherein the apparatus is configured to
transmit one or more first frames including only the data or the data and associated control information not including feedback signaling,
transmit, after the transmission of the one or more first frames, a second frame, the second frame only indicating in the first part of the frame, using the control signaling, that the feedback for the data in the one or more first frames is to be provided by the UE, and
receive, during the frame duration of the second frame, the feedback for the data in the one or more first frames.

In other words, one or more regular or /conventional data only frames first (no control signaling regarding a feedback included) are transmitted, followed by a novel control only frame so that in the remaining duration of the control only frame the feedback for the data in the preceding data only frames is received.

Receiving Apparatus or UE

The present invention provides an apparatus for a wireless communication system,
wherein the apparatus is configured to be connected to at least one user device, UE, of the wireless communication system via a sidelink for a sidelink communication with the at least one UE,
wherein, for a unicast transmission to the UE, the apparatus is configured to receive a sidelink frame having a certain frame duration, a first part of the sidelink frame including a control signaling, the control signaling indicating to the UE whether a feedback is to be returned to the UE, the feedback indicating a successful reception of data at apparatus and/or a sidelink channel condition, and
wherein, in case the feedback to the UE is desired, the apparatus is configured to
receive from the first part of a current sidelink frame, using the control signaling, the indication that the feedback is to be provided by the apparatus such that in a subsequent sidelink frame a duration of the control signaling and data part is shorter, by a remaining duration, than the frame duration, and
determine and transmit the feedback for data transmitted in the current sidelink frame to the UE, during the remaining duration in the subsequent sidelink frame.

The present invention provides an apparatus for a wireless communication system,
wherein the apparatus is configured to be connected to at least one user device, UE, of the wireless communication system via a sidelink for a sidelink communication with the at least one UE,
wherein, for a unicast reception from the UE, the apparatus is configured to receive a sidelink frame having a certain frame duration, a first part of the sidelink frame including a control signaling, the control signaling indicating whether a feedback is to be returned to the UE, the feedback indicating a successful reception of data to the apparatus and/or a sidelink channel condition, and
wherein, in case the feedback from the UE is desired, the apparatus is configured to
retrieve from the first part of the frame the indication that the feedback is to be provided by the apparatus, and
determine the feedback and transmit the feedback to the UE during the frame duration.

In other words, an apparatus (UE) receiving from another UE via a SL is provide, which, responsive to an indication in the frame that SL feedback is to be employed, transmits the feedback during the frame duration.

In accordance with embodiments, for a unicast reception of data and in case the feedback is desired, the apparatus is configured to retrieve from the first part of the frame the control signaling and from a second part of the frame, using a data signaling, the data.

In accordance with embodiments, the apparatus is configured to
retrieve from the first and/or second part of the frame one or more reference signals,
determine one or more properties of the transmission channel form the UE to the apparatus, like a channel state, CSI, and
transmit information about the transmission channel properties to the UE.

In accordance with embodiments, the apparatus is configured to
receive one or more first frames indicating in the first part of the frame, using the control signaling, that no feedback is to be provided by the UE, and in the second part of the frame, using the data signaling, the data,
receive a second frame, the second frame only indicating in the first part of the frame, using the control signaling, that the feedback for the data in the one or more first frames is to be provided by the UE, and
determine and transmit, during the frame duration of the second frame, the feedback for the data in the one or more first frames.

In other words, one or more novel data only frames are received first (control indicates that no feedback is needed), followed by a control only frame so that in the remaining duration of the control only frame the feedback for the data in the preceding data only frames is transmitted.

In accordance with embodiments, the apparatus is configured to
- receive one or more first frames including only the data,
- receive a second frame, the second frame only indicating in the first part of the frame, using the control signaling, that the feedback for the data in the one or more first frames is to be provided by the UE, and
- determine and transmit, during the frame duration of the second frame, the feedback for the data in the one or more first frames.

In other words, one or more regular or /conventional data only frames first (no control signaling regarding a feedback included) are received, followed by a novel control only frame so that in the remaining duration of the control only frame the feedback for the data in the preceding data only frames is transmitted.

Transmitting and Receiving Apparatus or UE

In accordance with embodiments, wherein the frame has a transmission time interval or a certain interval for which the apparatus reserved resource, like a subframe, a III, a slot, and/or a mini-slot.

In accordance with embodiments, the feedback indication incudes one or more of:
- a single bit for a feedback, like a no feedback flag,
- a HARQ process number,
- a request for aggregated feedback returning an array of acknowledgements/non-acknowledgements,
- CSI, power control,
- request for CQI, RSSI, RSRP, RSRQ, RI, PMI.

In accordance with embodiments, the remaining duration has a processing time at the UE to process the received information and/or and switch time at the UE for tuning to a new frequency band.

In accordance with embodiments, the feedback indicates a successful/non-successful reception of data in a frame preceding the current frame.

In accordance with embodiments, the feedback comprises one or more of
- an HARQ feedback including an acknowledgement, ACK, message and/or a non-acknowledgement, NACK, message,
- a bundled or aggregated HARQ feedback,
- a group-HARQ feedback after receiving a group of data packets using
  - a group ACK message, or
  - a selective repeat NACK message including a bitmap indicating which packet was not received and which packet is to be retransmitted, or
  - a bitmap acknowledging all received data packets so that non-indicated packets are automatically retransmitted.

In accordance with embodiments, the apparatus is configured to operate
- in accordance with a first mode, for example the V2X Mode 3, for a sidelink communication, in the first mode scheduling of the resources for the sidelink communication with the one or more other UEs being performed by a base station, gNB, of the wireless communication system, or
- in accordance with a second mode, for example the V2X Mode 4, for a sidelink communication with one or more other UEs, and to schedule resources from a transmit/receive resource set for the sidelink communication autonomously.

In accordance with embodiments, the base station comprises one or more of
- a macro cell base station, or
- a small cell base station, or
- a central unit of a base station, or
- a distributed unit of a base station, or
- a road side unit, or
- a UE, or
- a remote radio head, or
- an AMF, or
- an SMF, or
- a core network entity, or
- mobile edge computing entity, or
- a network slice as in the NR or 5G core context, or
- any transmission/reception point, TRP, enabling an item or a device to communicate using the wireless communication network, the item or device being provided with network connectivity to communicate using the wireless communication network.

In accordance with embodiments, the apparatus comprises one or more of
- a mobile terminal, or
- stationary terminal, or
- cellular IoT-UE, or
- vehicular UE, or
- an IoT or narrowband IoT, NB-IoT, device, or
- a ground based vehicle, or
- an aerial vehicle, or
- a drone, or
- a moving base station, or
- road side unit, or
- a building, or
- any other item or device provided with network connectivity enabling the item/device to communicate using the wireless communication network, e.g., a sensor or actuator.

System

The present invention provides a wireless communication network, comprising at least one of the inventive UEs and at least one of the inventive base stations.

Methods

The present invention provides a method for transmitting from a transmitting UE to a receiving UE in a wireless communication system via a sidelink, the method comprising:
- transmitting, by the transmitting UE, a sidelink frame having a certain frame duration, a first part of the sidelink frame including a control signaling, the control signaling indicating to the UE whether a feedback is to be returned to the apparatus, the feedback indicating a successful reception of data at the UE and/or a sidelink channel condition, and
- wherein, in case the feedback from the UE is desired,
  - transmitting in the first part of a current sidelink frame, using the control signaling, the indication that the feedback is to be provided by the UE such that in a subsequent sidelink frame a duration of the control signaling and data part is shorter, by a remaining duration, than the frame duration, and
  - receiving, at the transmitting UE, during the remaining duration in the subsequent sidelink frame, the feedback from the receiving UE for data transmitted in the current sidelink frame.

The present invention provides a method for transmitting from a transmitting UE to a receiving UE in a wireless communication system via a sidelink, the method comprising:
- transmitting, by the transmitting UE, a sidelink frame having a certain frame duration to the receiving UE, a first part of the sidelink frame including a control signaling, the control signaling indicating to the UE whether a feedback is to be returned to the apparatus, the feedback indicating a successful reception of data at the UE and/or a sidelink channel condition, and
- in case the feedback from the receiving UE is desired,
  - transmitting in the first part of the frame, using the control signaling, the indication that the feedback is to be provided by the UE such that a duration of the control signaling is shorter, by a remaining duration, than the frame duration, and
  - receiving, at the transmitting UE, during the remaining duration the feedback from the receiving UE.

The present invention provides a method for transmitting from a transmitting UE to a receiving UE in a wireless communication system via a sidelink, the method comprising:
- receiving, at the receiving UE, a sidelink frame having a certain frame duration, a first part of the sidelink frame including a control signaling, the control signaling indicating to the UE whether a feedback is to be returned to the UE, the feedback indicating a successful reception of data at apparatus and/or a sidelink channel condition, and
- wherein, in case the feedback,
  - receiving, by the receiving UE, from the first part of a current sidelink frame, using the control signaling, the indication that the feedback is to be provided such that in a subsequent sidelink frame a duration of the control signaling and data part is shorter, by a remaining duration, than the frame duration, and
  - determining and transmitting, by the receiving UE, the feedback for data transmitted in the current sidelink frame to the transmitting UE, during the remaining duration in the subsequent sidelink frame.

The present invention provides a method for transmitting feedback from a receiving UE to a transmitting receiving UE in a wireless communication system via a sidelink, the method comprising:
- receiving, at a receiving UE, a sidelink frame having a certain frame duration from a transmitting UE, a first part of the sidelink frame including a control signaling, the control signaling indicating whether a feedback is to be returned to the UE, the feedback indicating a successful reception of data to the apparatus and/or a sidelink channel condition, and
- in case the feedback is desired,
  - retrieving, by the receiving UE, from the first part of the frame the indication that the feedback is to be provided by the apparatus, and
  - determining the feedback and transmitting, by from the receiving UE, the feedback to the transmitting UE during the frame duration.

Computer Program Product

The present invention provides a computer program product comprising instructions which, when the program is executed by a computer, causes the computer to carry out one or more methods in accordance with the present invention.

Figure 5:
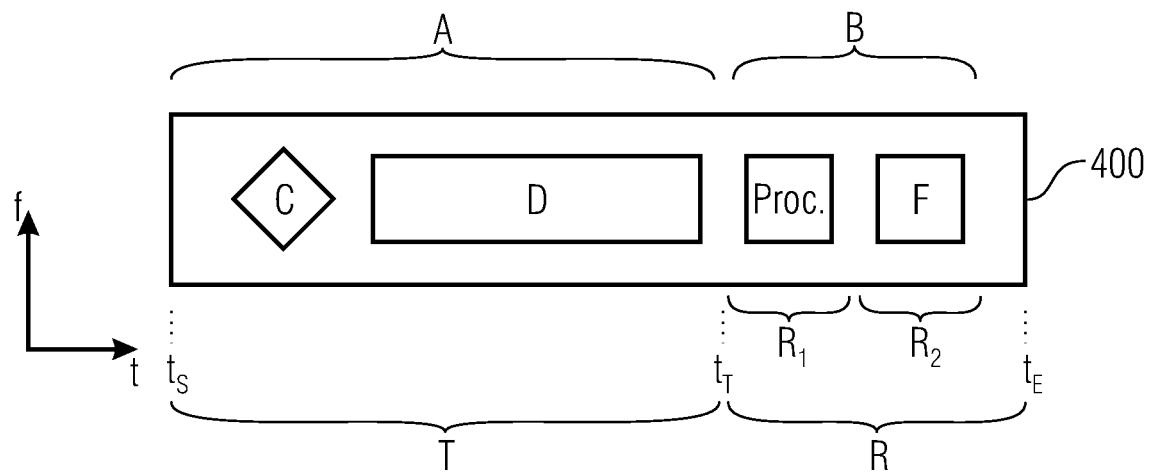
FIG. 5 illustrates an embodiment of the inventive approach for sending data from a transmitting UE to a receiving UE and to provide a feedback from the receiving UE to the transmitting UE.

FIG. 5 illustrates an embodiment of the inventive approach for sending data from a transmitting UE A to a receiving UE B and to provide a feedback from the receiving UE B to the transmitting UE A, wherein the data sent by the transmitting UE A, also referred to as user A, may comprise user data as well as control data for the receiving UE B, also referred to as user B. FIG. 5 illustrates an embodiment of a design for a self-contained sidelink frame 400 in accordance with embodiments of the present invention. The frame 400 has a duration from a start time $t_S$ to an end time $t_E$. The frame 400 may be a transmission time interval as defined by the wireless communication system in which the users A and B communicate with each other over the sidelink communication interface, or it may be any interval for which the apparatus, like the transmitting receiver or user A has reserved resources for a transmission to the user B. The frame 400 may be, for example, a sub-frame, a transmission time interval, a certain slot within the sub-frame or a mini-slot. In any case, it is assumed that the transmission time associated with user A starts at time $t_S$ and ends at time $t_E$. Rather than using the entire frame 400 for the transmission of data from the user A to the user B, to provide the feedback for the user A without the need for using a subsequent frame for a transmission from user B to user A, in accordance with the present invention, the transmission of data from the user A to the user B is only over a part of the frame duration T, for example until a time $t_T$ so that the actual transmission time T is from time $t_S$ to time $t_T$ and the duration from the time $t_T$ to the end of the frame $t_E$ may be used for a transmission from the user B to the user A and may be referred to as a remaining duration or remaining frame time R. In the embodiment depicted in FIG. 5, it is assumed that the user A transmits data to the user B during the transmission time T which includes control data C and user data D. During the first part of the frame, during the time T, the user A transmits the control data or control signaling C followed by a secondary signal D containing the payload data and/or additional signaling, like requesting channel state information and/or reference symbols CSI-RS. This may also be referred to as piggybacking the additional signaling on the data. The transmission of data from the user A to the user B is followed by a time gap $R_1$ during the remaining duration R of the frame 400 to allow the user B to process the received data and/or for performing a switching between reception and transmission mode at the user B. After the time $R_1$, during the time $R_2$, the user B sends the feedback F which, in accordance with embodiments, may be a HARQ feedback including acknowledgement/non-acknowledgement messages, ACK, NACK, and/or additional feedback, such as a CSI, for example the CQI, RSSI (Received Signal Strength Indicator), RSRP (Received Signal Received Power), RSRQ (Reference Signal Received Quality) and in the case of MIMO RI (Rank Indicator) or PMI (Preferred Matrix Index).

The control signaling may be a physical sidelink control channel, PSCCH, which, in accordance with embodiments, is modified so as to include the additional information whether the UE B has to provide feedback about the information or not. After processing the received control information, like a received physical sidelink control channel PSCCH and, if also transmitted, a received physical sidelink shared channel, PSSCH, and decoding the control, user B knows whether a feedback is to be sent. If feedback is desired the user B signals a successful/non-successful reception at the user B and/or channel state information. Otherwise, in case no feedback is to be signaled, no further action is taken by the user B. For example, in case USER a indicates that there is no feedback to be signaled, then user B may consider the duration T to last till $t_E$.

In the example of FIG. 5, the control signaling C transmitted initially by user A at the beginning of the frame 400 includes an indication for the receiving UE B that the user B is to provide a feedback indicating a successful/non-successful reception of the control signaling and the data D. In accordance other embodiments, instead of the feedback for the data transmitted by the user A or in addition to the feedback for this data, information about the channel between the user A and the user B over the sidelink may be provided as feedback F from the user B to the user A so as to allow, for example, user A to carry out a link adaption and power control. For example, in such embodiments the feedback message may include a binary value indicating whether to increase or decrease a modulation encoding scheme, MCS, level for the next data transmission over the sidelink, and/or whether to adjust the power level by increasing or decreasing the transmit power for the next transmission over the sidelink by a certain amount, e.g. by steps of +1 dB or −1 dB.

FIG. 5 shows one example for transmitting data from a user A to a user B in accordance with the present invention using a modified frame 400 providing the time R at the end of the frame to allow the user B to transmit back to the user A the feedback within the duration of the frame 400 which may include, as mentioned above, the time for processing the receive data from the user A and/or a time for switching between receiving and transmitting at the user B as well as the time for performing the actual transmission of the feedback F. The present invention, however, is not limited to such a structure, rather, the frame transmitted from the user A to the user B may only include control information C and no user data or payload data D.

Figure 6:
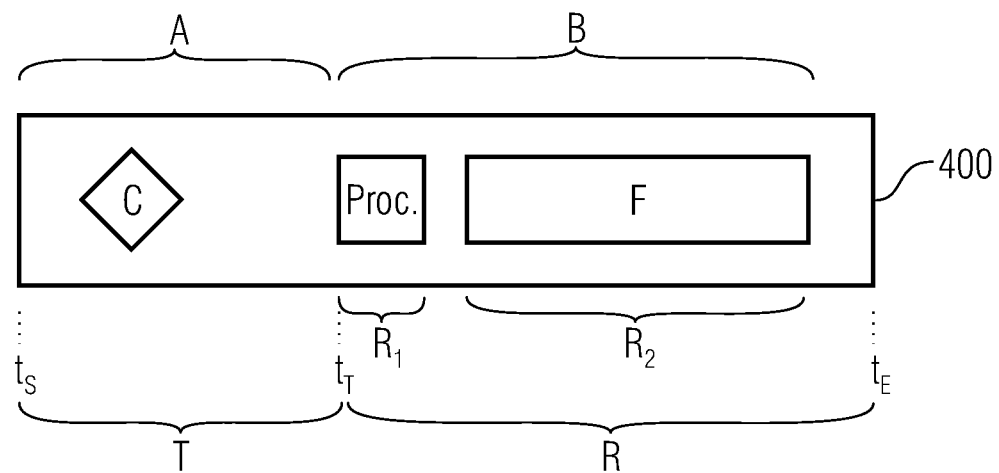
FIG. 6 illustrates an embodiment similar to FIG. 5, except that no payload data is transmitted.

FIG. 6 shows an embodiment of such a frame which is basically the same as the frame of FIG. 5 except that the payload data D is missing. Also, dependent on the amount of control signaling transmitted from the user A to the user B the transmission time T for the actual transmission of the user A may be shorter so that more time R is available for the user B. For example, the frame 400 depicted in FIG. 6 may be employed for transmitting a large feedback, like aggregated feedback for the user B to the user A following the transmission of a plurality of user data packets in a plurality of previous frames since the transmission of the first data packet (D D D F, D=data packet, F=feedback), as shall be discussed in further detail below. In addition, it can be used to send other large feedback reports, like CSI, a CQI, and/or a precoding matrix indicator (PMI) or rank indication (RI) information in case of MIMO transmissions. Also buffer status or UE capabilities can be transmitted.

FIG. 7 illustrates different examples for frames for transmitting data from user A to user B. FIG. 7(a) illustrates a conventional frame as it is currently used that may include control signaling and user data for the user B that is transmitted within the frame without providing any remaining time for the user B to send the feedback. In such conventional approaches, as mentioned above, following the transmission of the frame in FIG. 7(a), in case feedback is desired, a corresponding frame is be transmitted from the user B to the user A including the feedback information. This approach, while being possible, is disadvantageous due to the increased latency for providing the feedback to the user A which may be especially disadvantageous in cases where the payload to be transmitted from the user A to user B is time critical or delay critical, for example data associated with ULRCC services. FIG. 7(b) illustrates the structure of the frame as described above with reference to FIG. 5 allowing for sufficient time R at the end of the frame for providing feedback from the user B to the user A, as mentioned above, feedback about the reception of the data at the user B or information about the channel state. FIG. 7(c) illustrates another embodiment of the inventive frame structure including, during the transmission time T, in addition to the control signaling and the payload data also reference symbols RS, on the basis of which the user B may calculate the channel condition and provide information about the channel condition as feedback. FIG. 7(d) illustrates another example for providing the reference signals. When compared to FIG. 7(c), the frame in FIG. 7(d) may send the reference symbols or reference signals, like CSI-RS, not only within the sub-carriers defining the frame 400 in the frequency domain but also at higher frequencies or higher bandwidths. This is advantageous over the approach of FIG. 7(c) because it allows to measure the channel in a wider bandwidth. With this information better resources can be selected for subsequent transmissions.

The just-mentioned bundled or aggregated feedback information needs to be configured, for example using the control signaling via the physical sidelink control channel. In accordance with such embodiments, a first frame having a structure as in FIG. 6 may transmit signaling in its control section that a bundled or aggregated feedback is desired for a certain number n of subsequently sent data packets. Alternatively, the initial frame transmitted may be a frame as indicated in FIG. 5 including in addition to the control signaling indicative of the aggregated feedback to be provided already the first data packet. The subsequent frames may either be conventional sidelink frames as in FIG. 7(a) or inventive sidelink frames as described above in FIGS. 5 and 6 and in FIGS. 7(b) to 7(d) including data packets, and the final frame may be a frame as in FIG. 6 not including any payload data but only the control section from the user A to the user B and the feedback for the preceding packets from the user B to the user A. In accordance with embodiments, the aggregated feedback may be an aggregated HARQ feedback or group-HARQ feedback, i.e., acknowledgement/non-acknowledgement messages may be fed back from the user B to the user A. In accordance with such embodiments, the user A configures the user B to transmit the HARQ feedback after receiving the n-th data packet. In accordance with embodiments, user B may send this information as a bitmap so that the feedback may include:
 a group of ACK messages,
 a selective repeat NACK message by sending a bitmap indicating which packet was not received and which one is to be retransmitted,
 a bitmap acknowledging all received data packets, thereby signaling failed data packets and causing the user A to automatically retransmit the data packets for which the transmission failed.

Figure 7A:
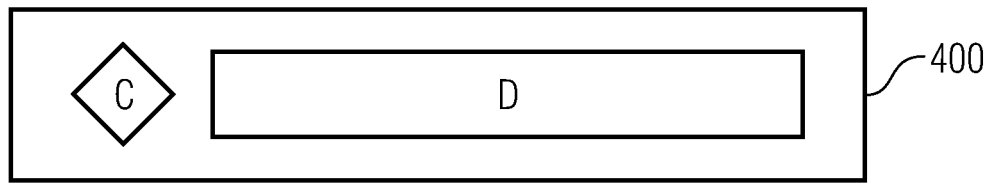
Figure 7B:
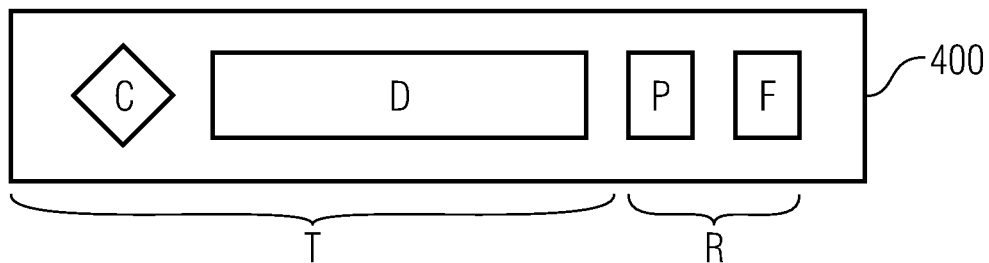
Figure 7C:
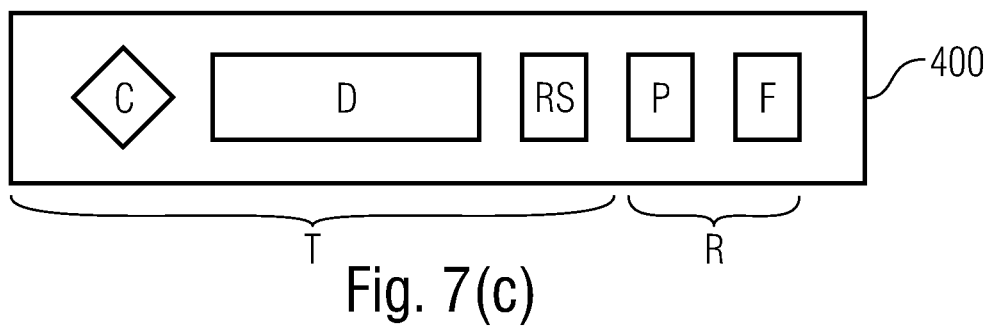
Figure 7D:
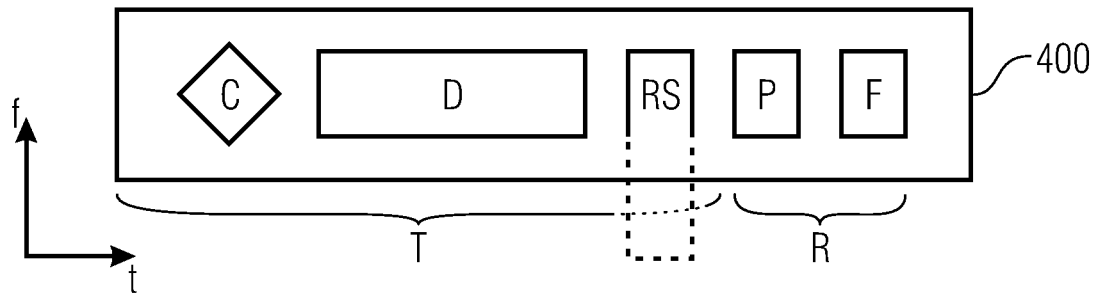
Figure 8:
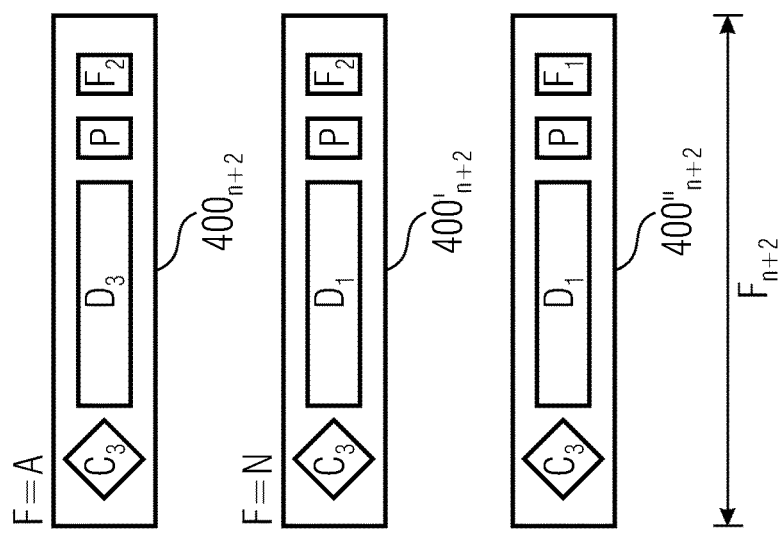
FIG. 8 schematically illustrates an embodiment for an aggregated feedback.

FIG. 8 schematically illustrates an embodiment for the above-described aggregated feedback. In the depicted embodiment it is assumed that four packets $D_1$ to $D_4$ of user data are transmitted from user A to user B and at only once the four packets are received, the user B is to return a feedback to user A about the four packets $D_1$ to $D_4$. Initially, in a first frame ①, a first data packet $D_1$ is transmitted in accordance with one of the inventive frame structures which includes control signaling telling the user B that four packets are transmitted from the user A to the user B and once these four packets are completed, a feedback is to be returned. The second, third and fourth data packets $D_2$ to $D_4$ may be transmitted using one of the inventive frame structures or a conventional frame structure as in FIG. 7(a), and following the transmission of the frames ①, ②, ③ and ④, in the fifth frame ⑤, a frame structure as in FIG. 6 may be used including control signaling from the user A to the user B and having a remaining duration R sufficient to allow the user B to transmit the feedback $F_{1-4}$ to the user A for each of the data packets $D_1$ to $D_4$.

As mentioned above, in addition to the feedback regarding the successful/non-successful reception of data packets at the user B, further fields may be included in the feedback allowing for the above-mentioned link adaption and power control.

In the embodiments described so far, the feedback provided by the user B concerned the data included in the current transmission of frame received from user A. However, the inventive approach is not limited to such an approach, rather, in accordance with other embodiments, the feedback provided by user B using the above-described frame structure may concern a feedback about the successful/non-successful reception of data in an earlier frame, for example in a frame preceding the current frame immediately or with some additional frames therebetween. In other words, after receiving data in an initial frame or transmission n, the above-described frame structure may be employed to provide the feedback from the user B in the next transmission n+1, or even later in the transmission n+2 or in the transmission n+3. This approach may be used for a HARQ feedback in case a time for processing the data transmitted by user A at the user B exceeds the remaining time R so that the actual feedback for the initial data packet is transmitted in one of the following transmissions n+1, n+2 or n+3.

Figure 9:
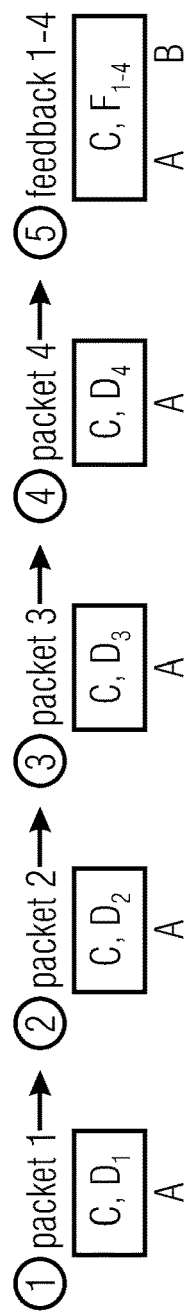
FIG. 9 illustrates an embodiment of a HARQ process using the inventive frame structure.
Figure 9:
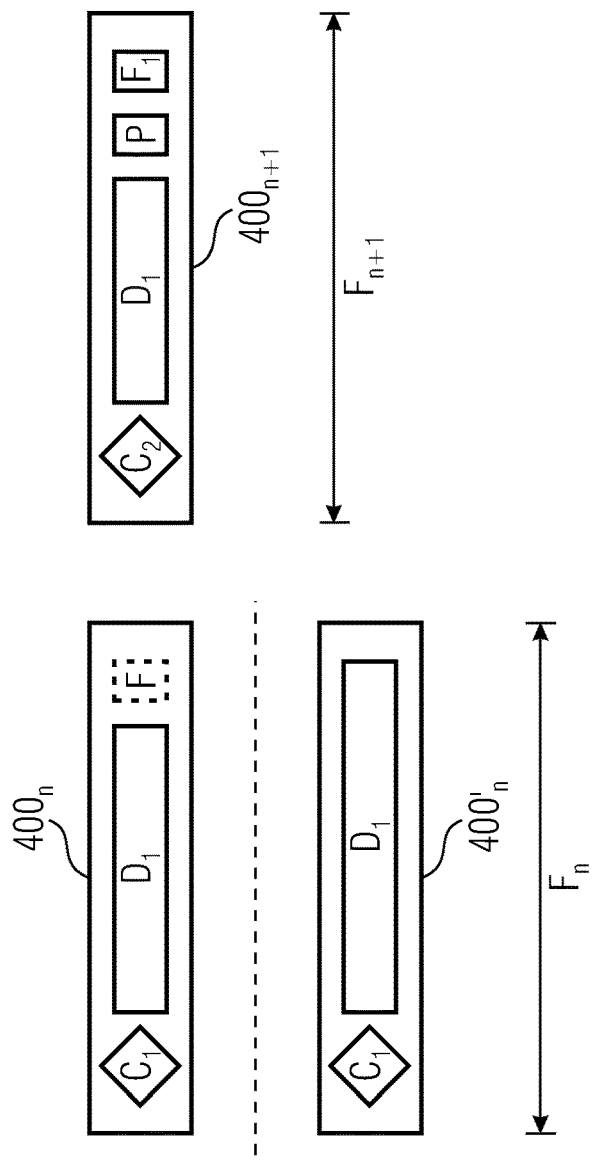

FIG. 9 illustrates an embodiment of the HARQ process using the inventive frame structure with a transmission of the feedback for a data packet transmitted in transmission n being sent in the next transmission n+1. A user A sends data to a user B, and user B sends the acknowledgement/non-acknowledgment feedback back to the user A which does not refer to a currently received data packet but to a data packet received prior to the current transmission. More specifically, as it is depicted in FIG. 9, initially in the frame $F_n$, the user A transmits the data $D_1$ to the user B. It is assumed that no feedback is send at this time back to the user A. The signaling that no feedback is to be send may be handled in different ways:

(i) For example, during the initial frame F n a sidelink control information, SCI, format may be used which does not include any feedback instructions, like a conventional SCI format as depicted at $400_n'$ in FIG. 9. For example, a SCI format as indicated in FIG. 7(a) not including any feedback information but only control information $C_1$ and the data $D_1$ may be used so that there is signaling of a feedback by the user B.

(ii) In accordance with another embodiment, the initial frame $F_n$ may be a frame having the inventive frame structure $400_n$, however, in the control signaling section $C_1$, by means of a feedback indicator F which is set to a predefined value, like zero–F=0, that user B does not have to send a feedback.

(iii) In accordance with yet other embodiments, instead of signaling in the control section $C_1$ of the inventive frame structure the feedback indicator F, a specific feedback type signaling may be employed indicating a certain feedback type, like HARQ, CSI, CQI or other qualified channel feedback or NOTHING, or any combination thereof. When signaling "NOTHING" no feedback is provided by the user B.

In the following frame $F_{n+1}$, user A sends control data $C_2$ and payload data $D_2$ to the user B and the control data $C_2$ indicates to the user B that a feedback is to be transmitted to the user A for the preceding data packet $D_1$. Accordingly, user B sends back the feedback $F_1$ within the remaining duration R of the frame $F_{n+1}$ which has a frame structure $400_{n+1}$ as described, for example, with reference to FIG. 5.

The feedback $F_1$ may be an acknowledgement message ACK, "A" causing the user A in the frame $F_{n+2}$ to transmit the next data packet $D_3$ together with a request for a feedback about data packet $D_2$ using a frame structure $400_{n+2}$.

In case the feedback $F_1$ indicates a non-acknowledgment "N", this may be due to the fact that the data $D_1$ was not successfully decoded at the user B or that the first transmission or first frame $F_n$ was completely missed at the user B. In the first case, the user A receiving the non-acknowledgment feedback indicating a non-successful decoding of the data packet $D_1$ retransmits in frame $F_{n+2}$ the data packet $D_1$ or performs any suitable retransmission, using the inventive frame structure $400'_{n+2}$ so that the user B may provide the feedback $F_2$ for the data packet $D_2$ received in frame $F_{n+1}$. In case the non-acknowledgment feedback indicates that the frame $F_n$ was completely missed at the user B, user A sends in frame $F_{n+2}$ using the inventive frame structure $400''_{n+2}$ resending the data packet $D_1$ and requesting feedback from the user B regarding the data packet $D_1$ during the frame $F_{n+2}$.

In accordance with further embodiments of the present invention, the sidelink control information, SCI, transmitted in the physical sidelink control channel may be provided with additional fields, like a HARQ process number H, a new data indicator NDI that toggles with new data for the HARQ process, and a feedback indicator F.

Figure 10A:
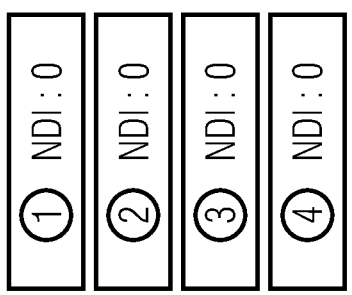
Figure 10B:
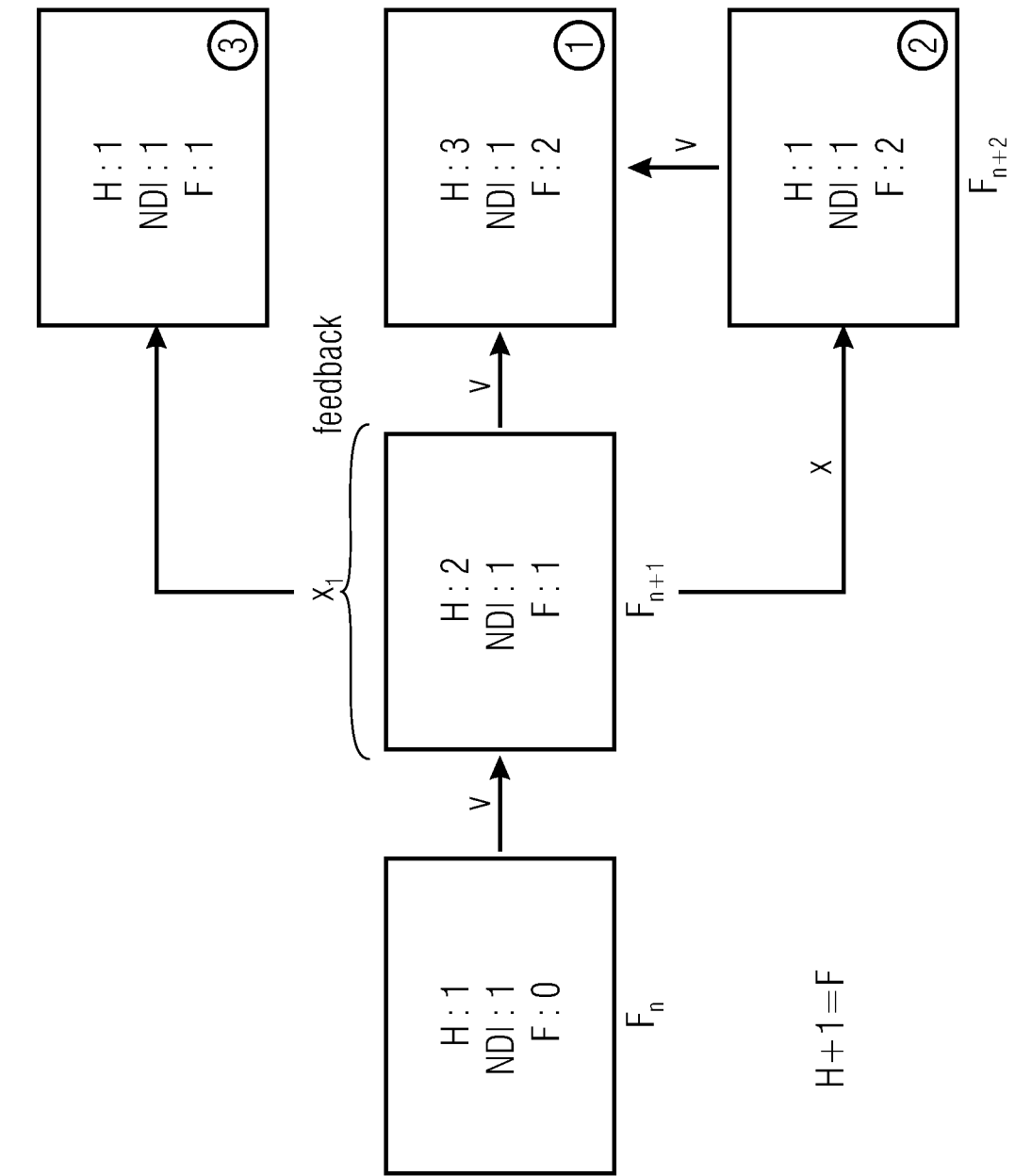

FIG. 10 illustrates the respective values for the new fields in the SCI at the user B, in case of the example of FIG. 9. FIG. 10(a) illustrates the initial state of the HARQ processes at user B, and FIG. 10(b) illustrates how the fields H, NDI, F change during the transmissions or frames in FIG. 9. In FIG. 10 it is indicated that H+1=F, so as to indicate what the value range may be. H=HARQ Process number and F=Feedback Request number. For example H has a range of 1-4, F having a value of 1, 2, 3 or 4 means feedback should be sent for the corresponding H process, and F=0 means that no feedback is requested. In another example, when a three bit value is used, H may range from 1 to 7, and F ranges from 0 to 7, with F=0 corresponding to no feedback.

FIG. 10(a) illustrates the initial HARQ process state. Before beginning the unicast transmission.

As is depicted in FIG. 10(b), during the initial transmission in frame $F_n$ H=1 and NDI=1 meaning data is sent for the first HARQ process and the toggled NDI indicates the HARQ buffer should be flushed as new data is sent, however F=0 meaning that no feedback is to be send. In the frame $F_{n+1}$ the user A transmits data $D_2$ (see FIG. 9) so that the SCI at the user B indicates H=2 and NDI=1 meaning that data for the second HARQ process is sent. The NDI is toggled as it is a new data packet. Further, the feedback indicator F=1 indicating that user B sends a feedback for the transmission of the data $D_1$ in the first frame $F_n$.

In case the feedback in frame $F_{n+1}$ indicates that the initial transmission was successful ("✓"), in frame $F_{n+2}$, the user A may transmit a frame including the data packet $D_3$ together with a request for a feedback for the data packet $D_2$. In this case, as is shown in FIG. 10 at ①, the SCI at the user B indicates H=3 and NDI=1 meaning new data is sent for the $3^{rd}$ HARQ process. Further, the feedback indicator F=2 indicating that user B sends a feedback for the transmission of the data $D_2$ in the second frame $F_{n+1}$.

In case the feedback in frame $F_{n+1}$ indicated that the data was not successfully decoded ("x"), in frame $F_{n+2}$ the user A retransmits the data $D_1$ together with a request for a feedback regarding the transmission of the data packet $D_2$ which, when being successful, causes the user A to send the next data packet $D_3$. In this case, as is shown in FIG. 10 at ②, the SCI at the user B indicates H=1 and NDI=1 meaning additional redundancy is sent for the first HARQ process. Further, the feedback indicator F=2 indicating that user B sends a feedback for the transmission of the data $D_2$ in the second frame $F_{n+1}$.

In case the first frame $F_n$ was not received or missed at the user B ("x1") so that in frame $F_{n+3}$ user A sends again the data packet $D_1$. In this case, as is shown in FIG. 10 at ③, the SCI at the user B indicates H=1 and NDI=1 meaning additional redundancy is sent for the first packet. Further, the feedback indicator F=1 indicating that user B sends a feedback for the retransmission of the data $D_1$.

Figure 11:
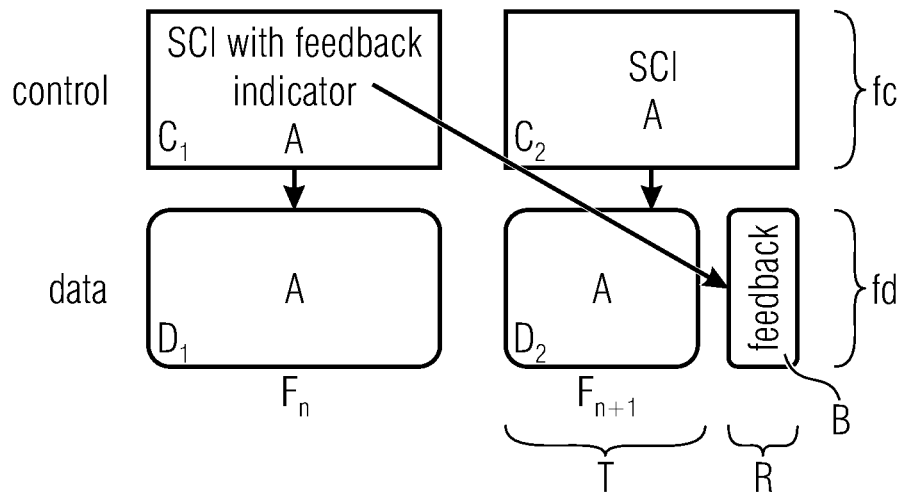
FIG. 11 shows an embodiment of the inventive approach employing FDM control.

In accordance with the embodiments described above, the control data and the user data have been sent at different times, i.e., using a TDM control, however, the present invention is to limited to a TDM control, rather, control data and user data may be sent at the same time on different resources in frequency, i.e., a FDM control may be applied, and the above described approach may be used by sending the feedback indicator in a previous control message. FIG. 11 shows an embodiment of the inventive approach employing FDM control. Control data is transmitted in a first frequency band fc and user data is transmitted in a second frequency band fd. In a first frame $F_n$, a control message, SCI, may be transmitted including the above-described feedback indicator F. The feedback indicator tells the user B whether feedback for the data D1 transmitted in frame $F_n$ is to be returned to the user A or not in the next frame $F_{n+1}$. In FIG. 11, it is assumed that the feedback indicator tells the user B that a feedback regarding the data $D_1$ is to be returned to the user A so that, in frame $F_{n+1}$, the data frequency band or data channel fd is configured such that a second data packet $D_2$ is transmitted during the transmission time T which is less than the frame duration so that during the remaining duration R, the feedback may be transmitted from the user B back to the user A.

Figure 12:
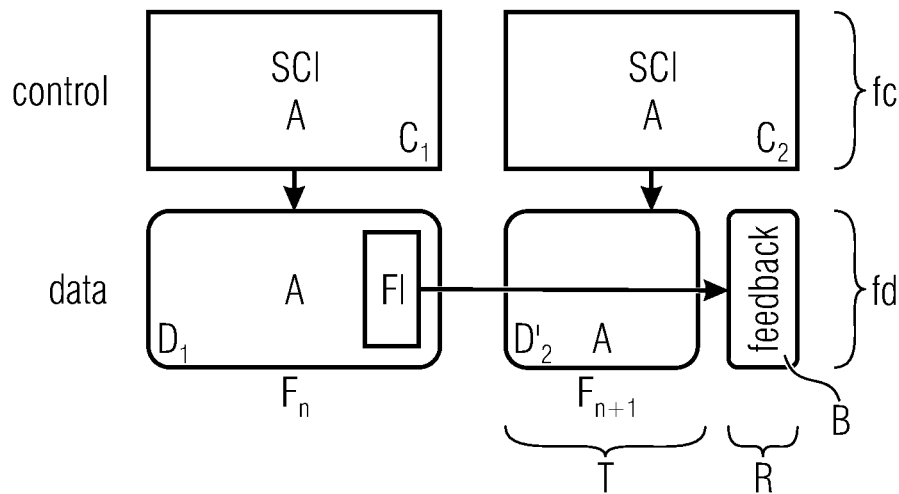
FIG. 12 shows another embodiment of the inventive approach employing FDM control piggybacking the feedback indication in the data region.

In accordance with further embodiments, the feedback indication may be piggybacked in the data Region, as is illustrated in FIG. 12. FIG. 12 is similar to FIG. 11, except that the feedback indicator is contained in the data packet $D_1$, which is sent from user A to user B. User B decodes data packet $D_1$ in frame $F_n$ and reads the feedback indicator, which tells the user B that a feedback regarding the data $D_1$ is to be returned to the user A so that, in frame $F_{n+1}$, the data frequency band or data channel fd is configured such that a second data packet $D_2$ is transmitted during the transmission time T which is less than the frame duration so that during the remaining duration R, the feedback may be transmitted from the user B back to the user A.

In some of the embodiments described above, reference has been made to respective vehicles being either in the connected mode, also referred to as mode 1 or mode 3 configuration, or vehicles being in the idle mode, also referred to as mode 2 or mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 13:
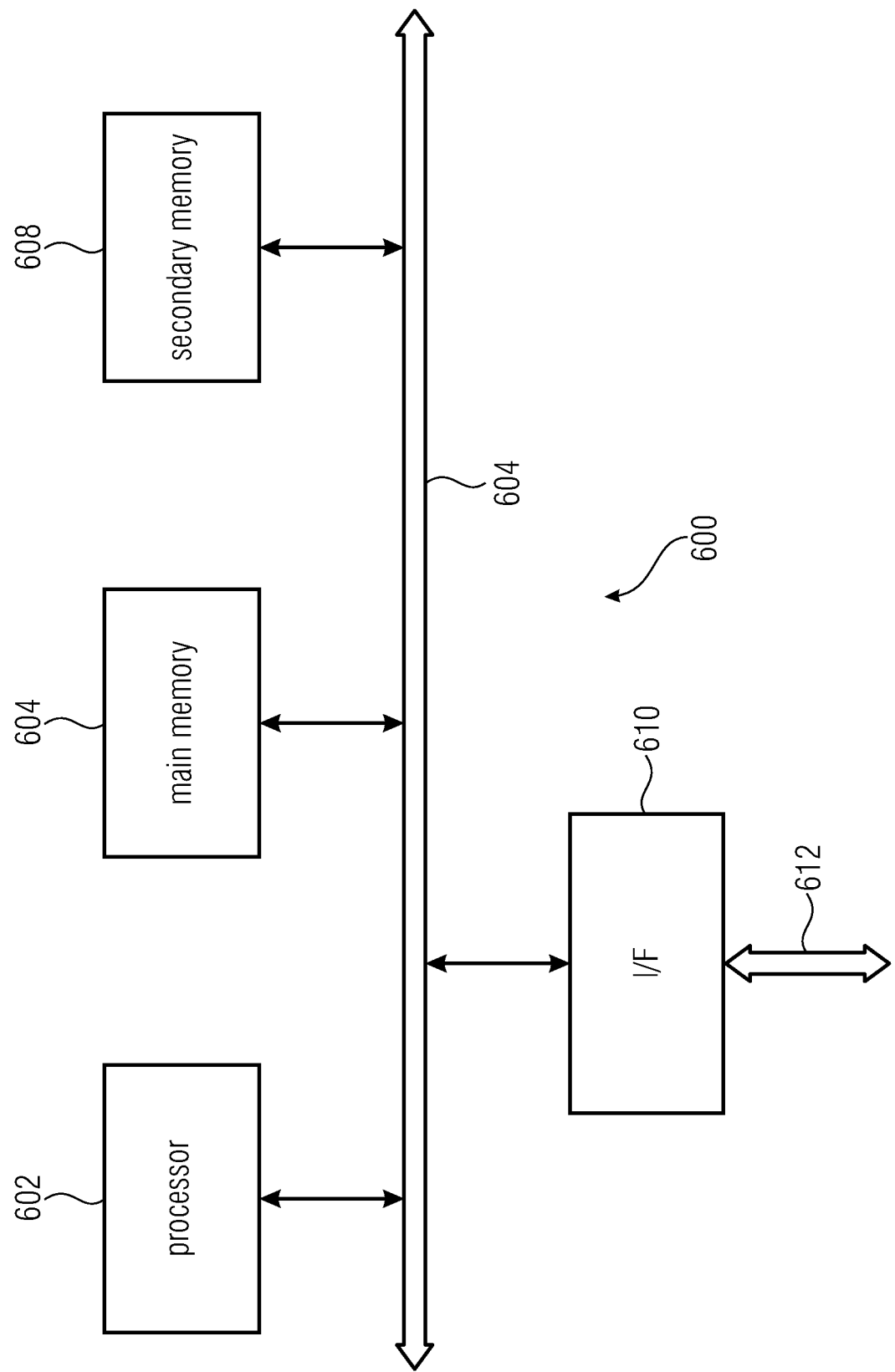
FIG. 13 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 13 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

| | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |

The invention claimed is:

1. An apparatus for a wireless communication system,
wherein the apparatus is configured to be connected to at least one user device (UE) of the wireless communication system via a sidelink for a sidelink communication with the at least one UE,
wherein, for a unicast transmission to the UE, the apparatus is configured to transmit a sidelink frame comprising a certain frame duration, a first part of the sidelink frame comprising a control signaling, the control signaling indicating to the UE whether a feedback is to be returned to the apparatus, the feedback indicating a successful reception of data at the UE or a sidelink channel condition, and
wherein, in case the feedback from the UE is desired, the apparatus is configured to
 transmit in the first part of a current sidelink frame, using the control signaling, the indication that the feedback is to be provided by the UE such that, in a subsequent sidelink frame, a duration of a data part is shortened by a remaining duration, and
 receive from the UE, during the remaining duration in the subsequent sidelink frame, the feedback for data transmitted in the current sidelink frame.

2. The apparatus of claim 1, wherein, for a unicast transmission of data to the UE and in case the feedback from the UE is desired, the apparatus is configured to transmit in the first part of the frame the control signaling and in a second part of the frame, using a data signaling, the data such that a combined duration of the control signaling and the data signaling is shorter, by the remaining duration, than the frame duration.

3. The apparatus of claim 1, wherein the remaining duration is such that the UE is able to process the control signaling and/or the data signaling, and to return the feedback to the apparatus during the frame duration.

4. The apparatus of claim 1, wherein the apparatus is configured to
include into the first or second part of the frame one or more reference signals, the reference signals used at the UE to determine one or more properties of the transmission channel from the apparatus to the UE,
receive from the UE information about the transmission channel properties, and
adapt transmission parameters responsive to the received transmission channel properties.

5. The apparatus of claim 4, wherein the apparatus is configured to transmit the one or more reference signals in a first frequency range and in at least a second frequency range, the frequencies in the second frequency range being higher than the frequencies in the first frequency range.

6. The apparatus of claim 4, wherein the apparatus is configured to
transmit one or more first frames indicating in the first part of the frame, using the control signaling, that no feedback is to be provided by the UE, and transmit in the second part of the frame, using the data signaling, the data,
transmit, after the transmission of the one or more first frames, a second frame, the second frame only indicating in the first part of the frame, using the control signaling, that the feedback for the data in the one or more first frames is to be provided by the UE, and
receive, during the frame duration of the second frame, the feedback for the data in the one or more first frames.

7. The apparatus of claim 1, wherein, in case no feedback from the UE is desired, the apparatus is configured to transmit in the first part of the frame, using the control signaling, an indication that no feedback is to be provided by the UE, and in the second part of the frame, using the data signaling, the data such that a combined duration of the control signaling and the data signaling is equal to the frame duration.

8. The apparatus of claim 1, wherein the apparatus is configured to
transmit one or more first frames comprising only the data or the data and associated control information not comprising feedback signaling,
transmit, after the transmission of the one or more first frames, a second frame, the second frame only indicating in the first part of the frame, using the control signaling, that the feedback for the data in the one or more first frames is to be provided by the UE, and
receive, during the frame duration of the second frame, the feedback for the data in the one or more first frames.

9. The apparatus of claim 1, wherein the frame comprises a transmission time interval or a certain interval for which the apparatus reserved resource.

10. The apparatus of claim 1, wherein the feedback indication incudes one or more of:
a single bit for a feedback,
a Hybrid Automatic Repeat Request (HARQ) process number,
a request for aggregated feedback returning an array of acknowledgements or non-acknowledgements,
channel state information (CSI),
a request for a Channel Quality Indicator (CQI), a Receive Signal Strength Indicator (RSSI), a Reference Signal Received Power (RSRP), a Reference Signal Received Quality (RSRQ), a Rank Indicator (RI), Precoding Matrix Index (PMI).

11. The apparatus of claim 1, wherein the remaining duration comprises a processing time at the UE to process the received information or and switch time at the UE for tuning to a new frequency band.

12. The apparatus of claim 1, wherein the feedback indicates a successful or non-successful reception of data in a frame preceding the current frame.

13. The apparatus of claim 1, wherein the feedback comprises one or more of
an HARQ feedback comprising an acknowledgement, (ACK), message or a non-acknowledgement, (NACK), message,
a bundled or aggregated HARQ feedback,
a group-HARQ feedback after receiving a group of data packets using
a group ACK message, or
a selective repeat NACK message comprising a bitmap indicating which packet was not received and which packet is to be retransmitted, or
a bitmap acknowledging all received data packets so that non-indicated packets are automatically retransmitted.

14. The apparatus of claim 1, wherein the apparatus is configured to operate
in accordance with a first mode, for a sidelink communication, in the first mode scheduling of the resources for the sidelink communication with the one or more other UEs being performed by a base station; (gNB), of the wireless communication system, or
in accordance with a second mode, for a sidelink communication with one or more other UEs, and to schedule resources from a transmit or receive resource set for the sidelink communication autonomously.

15. The apparatus of claim 14, wherein the base station comprises one or more of
a macro cell base station, or
a small cell base station, or
a central unit of a base station, or
a distributed unit of a base station, or
a road side unit, or
a UE, or
a remote radio head, or
an Access and Mobility Function (AMF), or
a Service Management Function (SMF), or
a core network entity, or
mobile edge computing entity, or
a network slice as in a New Radio (NR) or 5th Generation (5G) core context, or
any transmission/and reception point (TRP) enabling an item or a device to communicate using the wireless communication network, the item or device being provided with network connectivity to communicate using the wireless communication network.

16. The apparatus of claim 1, wherein the apparatus comprises one or more of
a mobile terminal, or
stationary terminal, or
cellular Internet of Things UE (IoT-UE), or
vehicular UE, or
an IoT device or a narrowband IoT (NB-IOT) device, or
a ground based vehicle, or
an aerial vehicle, or
a drone, or
a moving base station, or
road side unit, or
a building, or any other item or device provided with network connectivity enabling the item/or device to communicate using the wireless communication network.

17. A wireless communication network, comprising a one or more apparatus of claim 1.

18. An apparatus for a wireless communication system,
wherein the apparatus is configured to be connected to at least one user device (UE) of the wireless communication system via a sidelink for a sidelink communication with the at least one UE,
wherein, for a unicast transmission to the UE, the apparatus is configured to receive a sidelink frame comprising a certain frame duration, a first part of the sidelink frame comprising a control signaling, the control signaling indicating to the UE whether a feedback is to be returned to the UE, the feedback indicating a successful reception of data at apparatus or a sidelink channel condition, and
wherein, in case the feedback to the UE is desired, the apparatus is configured to
receive from the first part of a current sidelink frame, using the control signaling, the indication that the feedback is to be provided by the apparatus such that, in a subsequent sidelink frame, a duration of and a data part is shortened by a remaining duration, and
determine and transmit the feedback for data transmitted in the current sidelink frame to the UE, during the remaining duration in the subsequent sidelink frame.

19. The apparatus of claim 18, wherein, for a unicast reception of data and in case the feedback is desired, the apparatus is configured to retrieve from the first part of the frame the control signaling and from a second part of the frame, using a data signaling, the data.

20. The apparatus of claim 18, wherein the apparatus is configured to
retrieve from the first or second part of the frame one or more reference signals,
determine one or more properties of the transmission channel from the UE to the apparatus and
transmit information about the transmission channel properties to the UE.

21. The apparatus of claim 18, wherein the apparatus is configured to
receive one or more first frames indicating in the first part of the frame, using the control signaling, that no feedback is to be provided by the UE, and in the second part of the frame, using the data signaling, the data,
receive a second frame, the second frame only indicating in the first part of the frame, using the control signaling, that the feedback for the data in the one or more first frames is to be provided by the UE, and
determine and transmit, during the frame duration of the second frame, the feedback for the data in the one or more first frames.

22. The apparatus of claim 18, wherein the apparatus is configured to
receive one or more first frames comprising only the data,
receive a second frame, the second frame only indicating in the first part of the frame, using the control signaling, that the feedback for the data in the one or more first frames is to be provided by the UE, and
determine and transmit, during the frame duration of the second frame, the feedback for the data in the one or more first frames.

23. An apparatus for a wireless communication system, wherein the apparatus is configured to be connected to at least one user device (UE) of the wireless communication system via a sidelink for a sidelink communication with the at least one UE,
wherein, for a unicast reception from the UE, the apparatus is configured to receive a sidelink frame comprising a certain frame duration, a first part of the sidelink frame comprising a control signaling, the control signaling indicating whether a feedback is to be returned to the UE, the feedback indicating a successful reception of data to the apparatus or a sidelink channel condition, and
wherein, in case the feedback from the UE is desired, the apparatus is configured to
retrieve from the first part of the frame the indication that the feedback is to be provided by the apparatus, and
determine the feedback and transmit the feedback to the UE during the frame duration.

24. A method for transmitting from a transmitting user device (UE) to a receiving user device (UE) in a wireless communication system via a sidelink, the method comprising:
transmitting, by the transmitting UE, a sidelink frame comprising a certain frame duration, a first part of the sidelink frame comprising a control signaling, the control signaling indicating to the UE whether a feedback is to be returned to the apparatus, the feedback indicating a successful reception of data at the UE or a sidelink channel condition, and
wherein, in case the feedback from the UE is desired,
transmitting in the first part of a current sidelink frame, using the control signaling, the indication that the feedback is to be provided by the UE such that, in a subsequent sidelink frame, a duration of and a data part is shortened by a remaining duration, and
receiving, at the transmitting UE, during the remaining duration in the subsequent sidelink frame, the feedback from the receiving UE for data transmitted in the current sidelink frame.

25. A method for transmitting feedback from a receiving user device (UE) to a transmitting user device (UE) in a wireless communication system via a sidelink, the method comprising:
receiving, at the receiving UE, a sidelink frame comprising a certain frame duration, a first part of the sidelink frame comprising a control signaling, the control signaling indicating to the UE whether a feedback is to be returned to the UE, the feedback indicating a successful reception of data at apparatus or a sidelink channel condition, and
wherein, in case the feedback from the receiving UE is desired,
receiving, by the receiving UE, from the first part of a current sidelink frame, using the control signaling, the indication that the feedback is to be provided such that, in a subsequent sidelink frame, a duration of a data part is shortened by a remaining duration, and
determining and transmitting, by the receiving UE, the feedback for data transmitted in the current sidelink frame to the transmitting UE, during the remaining duration in the subsequent sidelink frame.

26. A non-transitory digital storage medium having stored thereon a computer program for performing a method for transmitting from a transmitting user device (UE) to a receiving user device (UE) in a wireless communication system via a sidelink, the method comprising:

transmitting, by the transmitting UE, a sidelink frame comprising a certain frame duration, a first part of the sidelink frame comprising a control signaling, the control signaling indicating to the UE whether a feedback is to be returned to the apparatus, the feedback indicating a successful reception of data at the UE or a sidelink channel condition, and wherein, in case the feedback from the UE is desired,
transmitting in the first part of a current sidelink frame, using the control signaling, the indication that the feedback is to be provided by the UE such that, in a subsequent sidelink frame, a duration of a data part is shortened by a remaining duration, and receiving, at the transmitting UE, during the remaining duration in the subsequent sidelink frame, the feedback from the receiving UE for data transmitted in the current sidelink frame, when said computer program is run by a computer.

* * * * *

UNITED STATES PATENT AND TRADEMARK OFFICE
CERTIFICATE OF CORRECTION

| | |
|---|---|
| PATENT NO. | : 12,155,472 B2 |
| APPLICATION NO. | : 18/233730 |
| DATED | : November 26, 2024 |
| INVENTOR(S) | : Thomas Fehrenbach et al. |

Page 1 of 1

It is certified that error appears in the above-identified patent and that said Letters Patent is hereby corrected as shown below:

In the Claims

In Claim 3, Column 25, Line 1, delete "and/or" and insert -- or --

In Claim 18, Column 27, Line 24, delete "and"

In Claim 24, Column 28, Line 34, delete "and"

Signed and Sealed this
Twenty-fifth Day of March, 2025

Coke Morgan Stewart
*Acting Director of the United States Patent and Trademark Office*